United States Patent
Sinnadurai et al.

(10) Patent No.: US 9,384,311 B1
(45) Date of Patent: Jul. 5, 2016

(54) PROGRAMMABLE DEVICE CONFIGURATION METHODS INCORPORATING RETIMING

(71) Applicant: Altera Corporation, San Jose, CA (US)

(72) Inventors: Nishanth Sinnadurai, Scarborough (CA); Gordon Raymond Chiu, North York (CA)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 14/341,030

(22) Filed: Jul. 25, 2014

(51) Int. Cl.
*G06F 17/50* (2006.01)

(52) U.S. Cl.
CPC .................................. *G06F 17/5045* (2013.01)

(58) Field of Classification Search
CPC ............ G06F 17/5054; G06F 17/5059; G06F 17/5077; G06F 2217/84
USPC .................. 716/108, 110, 111, 113, 132, 134
See application file for complete search history.

(56) References Cited

U.S. PATENT DOCUMENTS

| | | | |
|---|---|---|---|
| 5,663,888 A | 9/1997 | Chakradhar | |
| 6,466,898 B1 | 10/2002 | Chan | |
| 7,120,883 B1 * | 10/2006 | van Antwerpen et al. | .... 716/102 |
| 7,299,458 B2 | 11/2007 | Hammes | |
| 7,594,195 B2 | 9/2009 | Jain et al. | |
| 7,926,016 B1 | 4/2011 | Sundararajan et al. | |
| 8,286,137 B2 | 10/2012 | Kahlon et al. | |
| 8,296,696 B1 | 10/2012 | Chiu et al. | |
| 8,402,408 B1 | 3/2013 | van Antwerpen et al. | |
| 8,677,298 B1 | 3/2014 | Manohararajah et al. | |
| 8,863,059 B1 * | 10/2014 | Fung et al. | .................... 716/113 |
| 2002/0162097 A1 | 10/2002 | Meribout | |
| 2004/0068711 A1 | 4/2004 | Gupta et al. | |
| 2004/0225970 A1 * | 11/2004 | Oktem | .............................. 716/1 |
| 2008/0276209 A1 | 11/2008 | Albrecht et al. | |
| 2009/0146686 A1 | 6/2009 | Voogel et al. | |
| 2010/0058261 A1 | 3/2010 | Markov et al. | |
| 2012/0227026 A1 | 9/2012 | Goldman et al. | |

OTHER PUBLICATIONS

Betz, V., et al., *Architecture and CAD for Deep-Submicron FPGAs*, Kluwer Academic Publishers, Feb. 1999.
Carloni, L.P., et al., "A Methodology for Correct-by-Construction Latency Insensitive Design", *ICCAD '99: Proceedings of the 1999 IEEE/ACM International Conference on Computer-aided Design*, pp. 309-315, 1999.
Cong, J., et al., "Physical Planning with Retiming", *ICCAD-2000: Proceedings of the 2000 IEEE/ACM International Conference on Computer-aided Design*, pp. 2-7, 2000.
Cormen, T.H., et al., *Introduction to Algorithms*, MIT Press and McGraw Hill, Third Edition, pp. 651-655, 2009.

(Continued)

*Primary Examiner* — Vuthe Siek
(74) *Attorney, Agent, or Firm* — Fletcher Yoder, P.C.

(57) ABSTRACT

A method of configuring an integrated circuit device with a user logic design includes placing and routing the user logic design, retiming the placed and routed user logic design, examining the retimed user logic design for at least one path that lacks sufficient registers for retiming, and rerouting the user logic design to find additional registers for further retiming the at least one path. Portions of the method may be performed iteratively until a condition, which may be a performance criterion, is met. The method may further include assuming the paths that are constrained have been repaired, and examining further paths downstream from those paths.

20 Claims, 7 Drawing Sheets

(56) References Cited

OTHER PUBLICATIONS

Dasdan, A., "Experimental Analysis of the Fastest Optimum Cycle Ratio and Mean Algorithms", *ACM Transactions on Design Automation of Electronic Systems*, vol. 9, No. 4, pp. 385-418, Oct. 2004.

Deokar, R.B., et al., "A Fresh Look at Retiming via Clock Skew Optimization", *DAC '95: Proceedings of the 32nd Annual ACM/IEEE Design Automation Conference*, pp. 310-315, 1995.

Eguro, K., "Supporting High-Performance Pipelined Computation in Commodity-Style FPGAs", University of Washington doctoral dissertation, pp. 1-168 (2008).

Hurst, A.P., et al., "Physical Placement Driven by Sequential Timing Analysis", *ICCAD-2004: Proceedings of the 2004 IEEE/ACM International Conference on Computer-aided Design*, pp. 379-386, 2004.

Leiserson, C.E., et al., "Retiming Synchronous Circuitry", Digital Equipment Corporation, Aug. 20, 1986, published in *Algorithmica*, vol. 6, No. 1, pp. 5-35, Jun. 1991.

Li, S., et al., "QuickRoute: A Fast Routing Algorithm for Pipelined Architectures", *2004 IEEE International Conference on Field-Programmable Technology* pp. 73-80 (2004).

Maheshwari, N., et al., *Timing Analysis and Optimization of Sequential Circuits*, Springer, pp. 9, 14-17, 1998.

Manohararajah, V., et al., "Heuristics for Area Minimization in LUT-Based FPGA Technology Mapping", *IEEE Transactions on CAD*, vol. 25, No. 11, pp. 2331-2340, Nov. 2006.

Sharma, A., et al., "PipeRoute: A Pipelining-Aware Router for FPGAs", *FPGA '03: Proceedings of the 2003 ACM/SIGDA eleventh international symposium on Field programmable gate arrays*, pp. 68-77 (Feb. 23-25, 2003).

Singh, D., et al., "The Case for Registered Routing Switches in Field Programmable Gate Arrays", *FPGA '01: Proceedings of the 2001 ACM/SIGDA ninth international symposium on Field programmable gate arrays*, pp. 161-169 (Feb. 11-13, 2001).

Singh, D.P., et al., Integrated Retiming and Placement for Field Programmable Gate Arrays, *FPGA '02: ACM International Symposium on Field Programmable Gate Arrays*, pp. 67-76, Feb. 2002.

Tsu, W., et al., "HSRA: High-Speed, Hierarchical Synchronous Reconfigurable Array", *FPGA '99: Proceedings of the 1999 ACM/SIGDA seventh international symposium on Field programmable gate arrays*, pp. 125-134 (1999).

Weaver, N., et al., "Post-Placement C-Slow Retiming for the Xilinx Virtex FPGA", *FPGA '03: ACM International Symposium on Field Programmable Gate Arrays*, pp. 185-194, Feb. 2003.

Weaver, N., et al., "The Effects of Datapath Placement and C-Slow Retiming on Three Computational Benchmarks" *FCCM '02: The 10th Annual IEEE Symposium on Field-Programmable Custom Computing Machines*, pp. 303-306, Feb. 2003.

\* cited by examiner

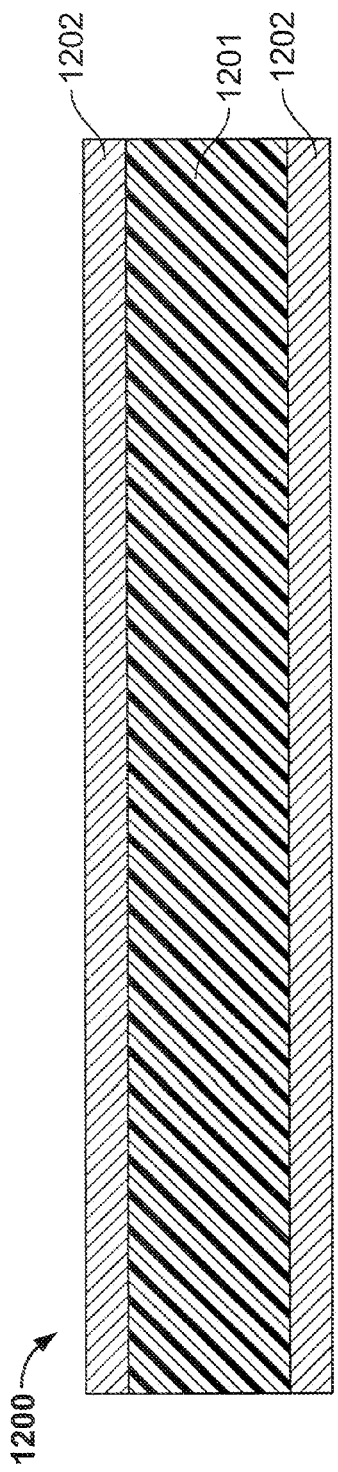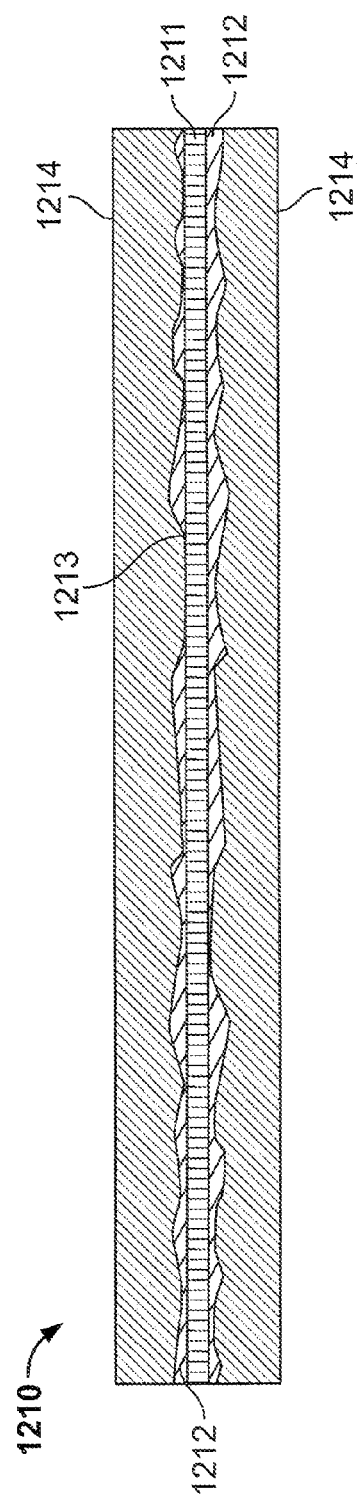

PROGRAMMABLE DEVICE CONFIGURATION METHODS INCORPORATING RETIMING

FIELD OF THE INVENTION

This invention relates to design or configuration methods for integrated circuit devices, including, e.g., field-programmable gate arrays (FPGAs) or other types of programmable logic devices (PLDs), and to design or configuration methods, for designing or configuring such devices, that incorporate retiming of the design or configuration.

BACKGROUND OF THE INVENTION

Early programmable devices were one-time configurable. For example, configuration may have been achieved by "blowing"—i.e., opening—fusible links. Alternatively, the configuration may have been stored in a programmable read-only memory. Those devices generally provided the user with the ability to configure the devices for "sum-of-products" (or "P-TERM") logic operations. Later, such programmable logic devices incorporating erasable programmable read-only memory (EPROM) for configuration became available, allowing the devices to be reconfigured.

Still later, programmable devices incorporating static random access memory (SRAM) elements for configuration became available. These devices, which also can be reconfigured, store their configuration in a nonvolatile memory such as an EPROM, from which the configuration is loaded into the SRAM elements when the device is powered up. These devices generally provide the user with the ability to configure the devices for look-up-table-type logic operations.

While it may have been possible to configure the earliest programmable logic devices manually, simply by determining mentally where various elements should be laid out, it was common even in connection with such earlier devices to provide programming software that allowed a user to lay out logic as desired and then translate that logic into a configuration for the programmable device. With current larger devices, it would be impractical to attempt to lay out the logic without such software. Similar software may be used to design fixed logic devices such as application-specific integrated circuits (ASICs).

Some user logic designs would be able to operate at higher clock speeds if the designs could be optimized. However, known configuration methods do not always take all possible optimizations into account.

SUMMARY OF THE INVENTION

Known configuration methods for programmable integrated circuit devices, as well as design methods for application-specific integrated circuits, optimize circuit designs by detecting the paths with the longest delay and applying optimization techniques to reduce or "crush" those delays. However, such techniques may not properly account for the ability to "retime" a design by moving registers within the design.

In particular, unidirectional or "feed-forward" logic paths are amenable to pipelining. And pipelined circuits can be retimed by changing the distribution of pipeline registers. Normally, this is accomplished by moving registers forward in a pipelined path. When a path is retimed, parallel paths are retimed as well to maintain circuit operability. However, there are not always enough registers available in all paths to support retiming. This may be referred to as an architectural constraint. Or there may be situations in which registers are present, but cannot be used because of other constraints.

The present invention provides methods for routing and retiming a logic design without exceeding the ability of the circuit to be retimed to accept the retiming.

Therefore, in accordance with the present invention there is provided a method of configuring an integrated circuit device with a user logic design. The method includes placing and routing the user logic design, retiming the placed and routed user logic design, examining the retimed user logic design for at least one path that lacks sufficient registers for retiming, and rerouting the user logic design to find additional registers for further retiming the at least one path.

A machine-readable data storage medium encoded with instructions for carrying out such a method also is provided.

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which:

FIG. 9 is a cross-sectional view of a magnetic data storage medium encoded with a set of machine-executable instructions for performing the method according to the present invention;

FIG. 10 is a cross-sectional view of an optically readable data storage medium encoded with a set of machine executable instructions for performing the method according to the present invention.

DETAILED DESCRIPTION OF THE INVENTION

Timing analysis under the assumption of the availability of retiming is known. For example, commonly-assigned U.S. Pat. No. 8,677,298, which is hereby incorporated by reference herein in its entirety, describes a method which identifies cyclic paths for optimization, leaving feed-forward paths to be retimed. However, even on a device which is physically provided with a large number of registers, retiming of a user logic design may not always be possible to the extent required, depending on the distribution of registers or other constraints.

Figure 1:
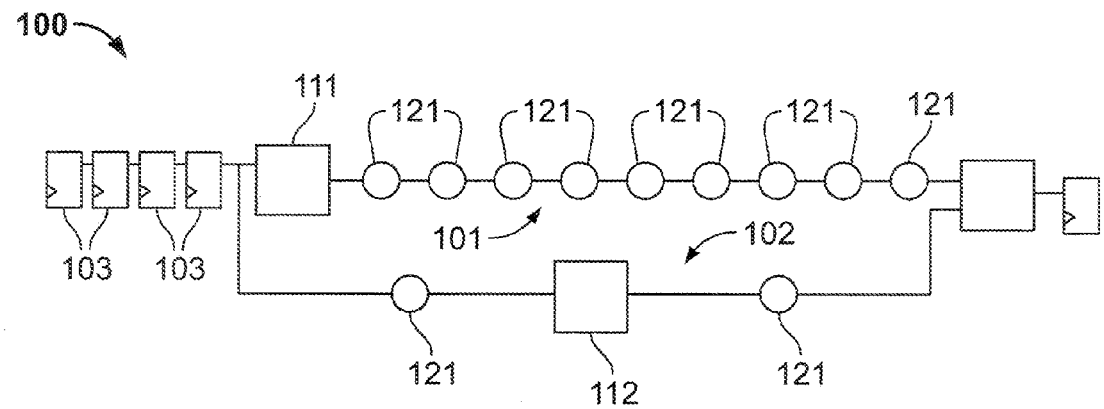
FIG. 1 shows an example of a circuit that may be optimized using embodiments of the present invention.
Figure 2:
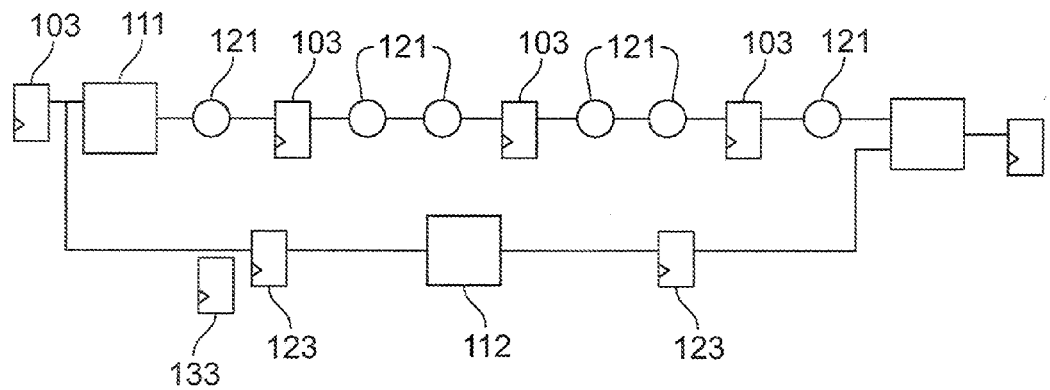
FIG. 2 shows an example of the application of a known optimization technique to the circuit of FIG. 1.
Figure 3:
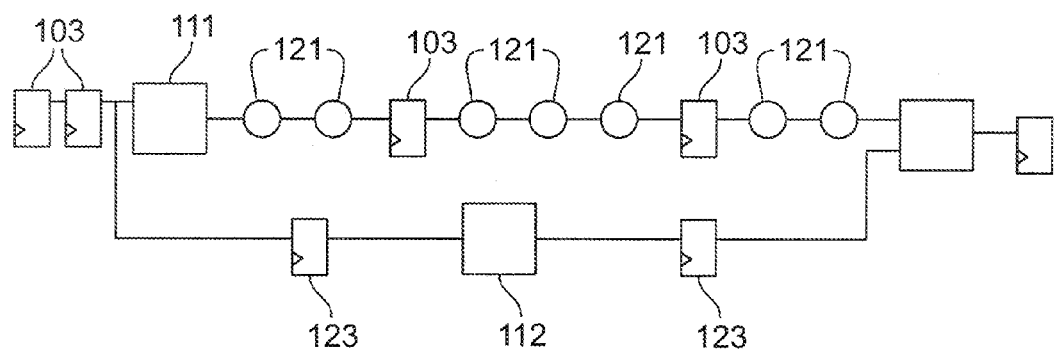
FIG. 3 shows the result of the application of the technique of FIG. 2 to the circuit of FIG. 1.

One example may be seen in FIGS. 1-3. FIG. 1 shows a portion 100 of a logic design having two parallel paths 101, 102. Upper path 101 includes one logic element 111 and nine routing elements 121. For purposes of this example, logic element 111 and routing elements 121 are assumed to have identical unit delays. Lower path 102 includes one logic element 112 and two routing elements 121. To maximize timing performance, the delays between registers should be minimized. Because of the longer length of path 101, it may benefit from retiming (the insertion of registers into the long combinational path), with some of input registers 103 moved forward into path 101.

In the example 200 of FIG. 2, three registers 103 have been moved forward into path 101. In one embodiment, routing elements 121 may include optional registers, and the registers are enabled if retiming is desired; thus in this case, the optional registers in the three routing elements 121 have been enabled). This necessitates the introduction of three registers 123 into path 102. However, with only two routing elements 121 available to have their registers enabled, path 102 lacks sufficient register capacity to enable three registers 123 (this condition is represented by lone unconnected register 133). The result is the less optimally retimed circuit 300 of FIG. 3, where only two of registers 103 can be pushed forward into path 101, balanced by two registers 123 enabled in path 102. Such a result, which may be referred to as a "short path," also may have been obtained even if the requisite number of registers were available in path 102, but some sort of constraint, such as a hold constraint, prevented all of the registers from being used.

In the face of such a result, a different route could be sought for path 102. In searching for such another route, care should be taken not to affect circuit functionality, meaning that block placements should not be changed, routing for other paths should not be disturbed (e.g., by stealing registers from another path to retime the current path, which would then require fixing the other path), and path endpoints (i.e., sinks and sources) should remain unchanged.

According to one alternative, short paths are repaired incrementally, meaning that when a short path is encountered during retiming, routing and retiming are repeatedly performed for that path until an acceptable path is found (or until a failure condition is met). According to another alternative, a more complete analysis of downstream paths is performed. Both alternatives will be described below.

Regardless of which alternative is selected, the method can be implemented so that it fails if some designated target performance—which would be selected by the user for the particular circuit—cannot be reached. Alternatively, the method can be implemented so that it accepts the best legal routing that can be obtained.

Figure 4:
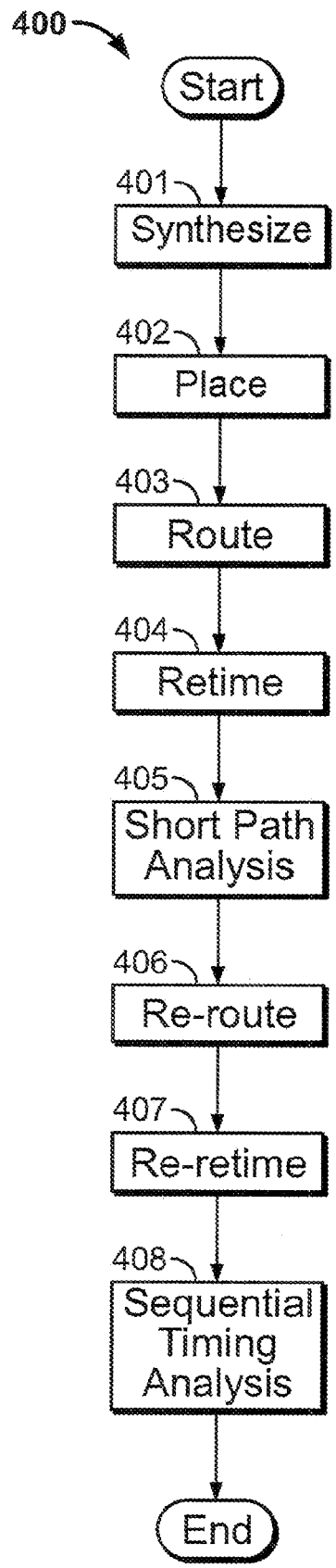
FIG. 4 shows a first implementation of a method according to embodiments of the present invention.

A simplified illustration of a method according to embodiments of the invention is shown in FIG. 4. Implementation 400 may be incorporated, for example, into FPGA configuration software such as the QUARTUS® software available from Altera Corporation, of San Jose, Calif., which may be executed on a personal computer or workstation equipped with an adapter into which an FPGA to be configured may be inserted.

Synthesis and placement, which may be conventional, are performed at 401 and 402, respectively. Next, routing and retiming are performed at 403 and 404, respectively. After retiming 404, short path analysis 405 (see below) is carried out to determine whether or not any short paths—i.e., paths that have insufficient registers (or at least in sufficient unconstrained registers) to accept retiming—exist, so that they can potentially be avoided or rerouted.

After short path analysis 405, rerouting and re-retiming are performed at 406 and 407, respectively, followed by performance at 408 of Sequential Timing Analysis, which may be conventional, and implementation 400 ends.

Figure 5:
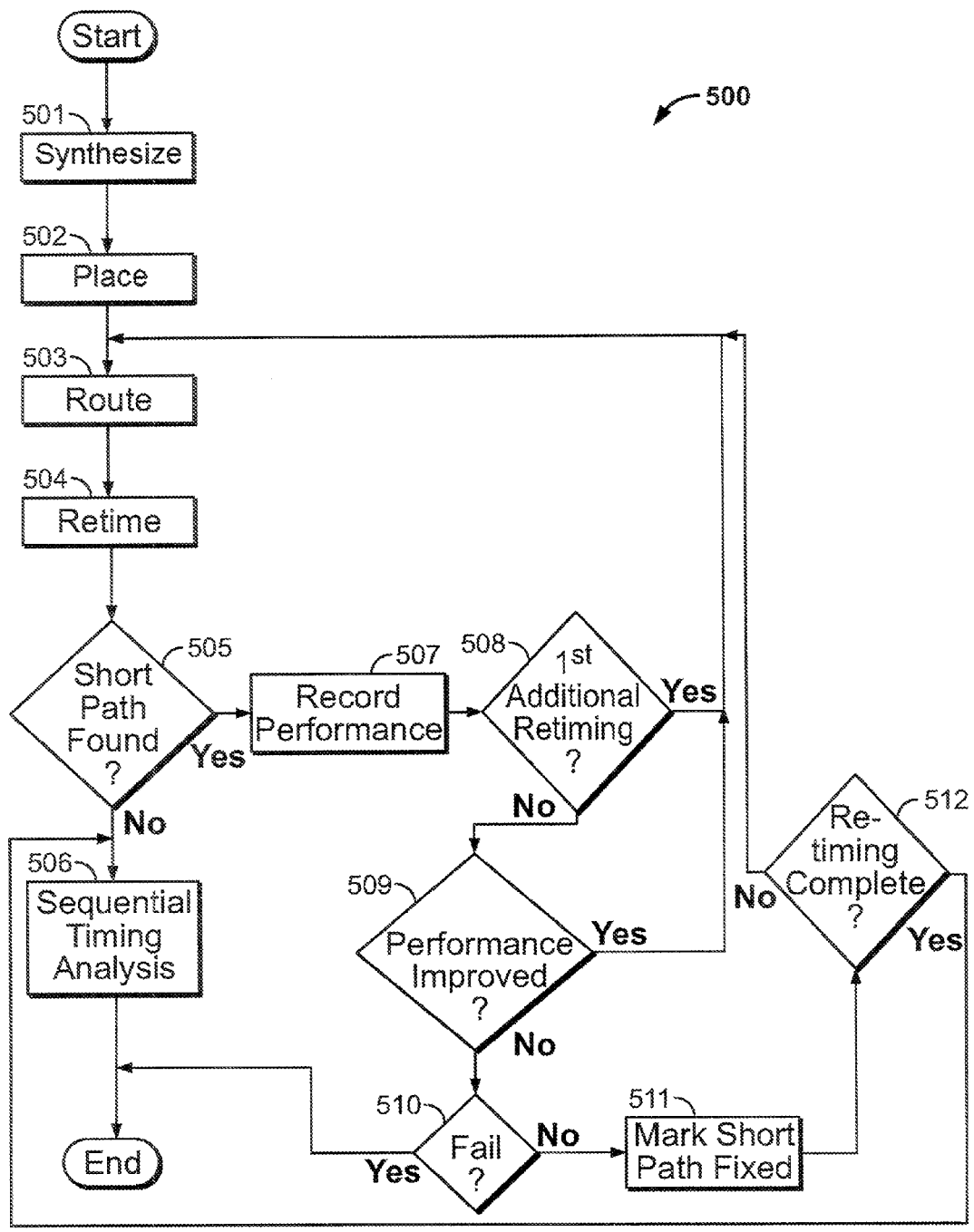
FIG. 5 shows a second implementation of a method according to embodiments of the present invention.

A more specific implementation 500 of the incremental approach referred to above may be described in conjunction with FIG. 5.

Synthesis and placement, which may be conventional, are performed at 501 and 502, respectively. Next, routing and retiming are performed at 503 and 504, respectively. After retiming 504, it is determined at 505 (see below) whether or not any short path has been found. If not, then Sequential Timing Analysis, which may be conventional, is performed at 506 and implementation 500 ends.

If at 505 it is determined that a short path has been found, then at 507 the performance of the design as currently routed is recorded (for later use as described below). Next, at 508, it is determined if this is the first time that additional retiming will be attempted. If so, implementation 500 returns to routing 503 with the short path marked. If at 508 is it determined that this is not the first time that additional retiming has been attempted, then at 509 the current performance, as recorded at 507, is compared to the performance before the previous retiming, also recorded at 507, to determine if performance improved as a result of the previous retiming. If so, implementation 500 returns to routing 503 (because still further improvement may be possible).

If at 509 is it determined that performance did not improve as a result of the previous retiming, then the most recent retiming is treated as being as good as it is going to get and at 510 it is determined whether the current level of performance represents a failure condition. As noted above, the user may elect to accept whatever result is achieved, in which case there could be no failure, or the user may elect to require some minimum performance level, in which case there could be a failure. If at 510 it is determined that the current level of performance represents a failure condition, then implementation 500 ends.

If at 510 it is determined that the current level of performance does not represent a failure condition, then at 511, the short path is marked as fixed and at 512 it is determined whether retiming is complete. Retiming would be complete if the entire routed and initially retimed design has been examined and all short paths have been fixed. Retiming would be incomplete if the entire routed and initially retimed design has not yet been examined. If at 512 it is determined that retiming is not complete, then implementation 500 returns to routing 503 to find and fix additional short paths. If at 511 it is determined that retiming is complete, then Sequential Timing Analysis is performed at 506 and implementation 500 ends.

As explained above, a short path is a path parallel to a retimed path that cannot be retimed to match because of the unavailability of registers as a result of an architectural or hold constraint. Several methods exist to find short paths, as at 405 or 505. These include, but are not limited to, performing critical chain detection, calculating cycle slacks for the system, or solving a constrained optimization problem representation of the retiming.

Calculating cycle slacks for the system may be performed by calculating for each edge in the system the maximum amount of delay that could be added to, or removed from, that edge before the system becomes critical. For each edge, a test amount of delay would be added (or removed), and then a retiming optimization would be performed. If the achieved frequency after retiming decreases relative to the base retiming result, then that edge is a long path (or a short path). Using a binary search, we can determine the threshold value of delay to add (or remove) for each edge, which may be referred to as the long path slack (or short path slack). Edges with the lowest short path slack are the short paths of the circuit.

Solving a constrained optimization problem representation of the retiming may be implemented by expressing physical and logical constraints of the system (including architectural or hold constraints, and timing constraints) as a plurality of integer linear inequalities. An integer linear programming solver may be used to discover, out of those constraints that cannot be satisfied, a subset of such constraints which indicates the short paths present in the circuit.

Figure 6:
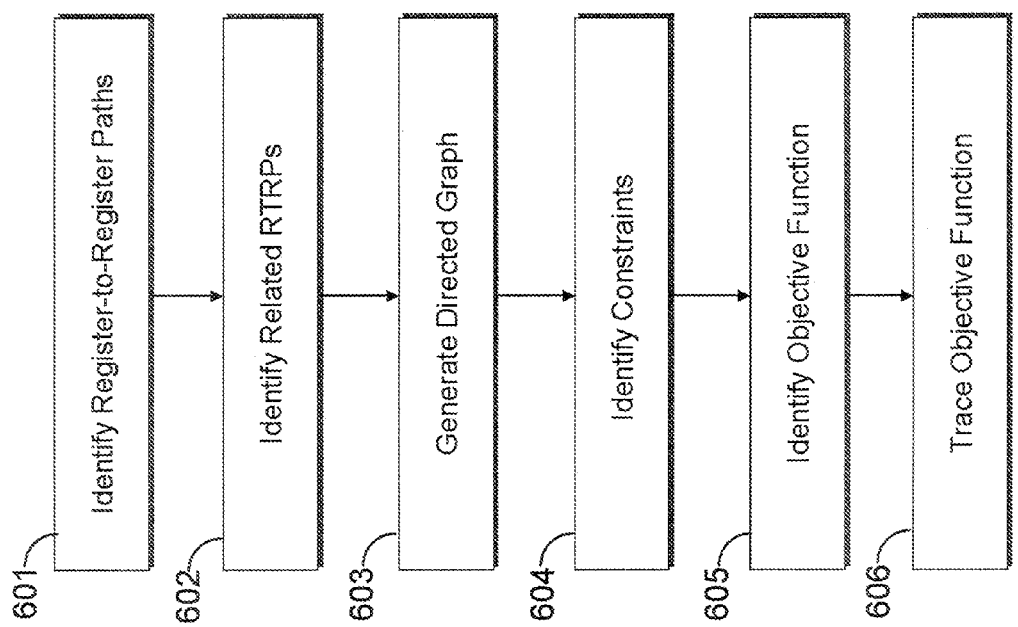
FIG. 6 is a flow chart illustrating critical chain detection as used in implementations of the present invention.

Critical chain detection may be implemented as shown in FIG. 6. At 601, register-to-register paths (RTRPs) are identified and, according to one implementation, the worst case slack associated with each of the RTRPs also is identified. At 602, RTRPs that are related are identified. According to one implementation, two RTRPs are related if retiming one RTRP would affect the other RTRP. For example, the related RTRPs may share a same endpoint register. Alternatively, because of topology restrictions, latency restrictions, architecture restrictions, or other restrictions, retiming one register may require moving another register.

Figure 7:
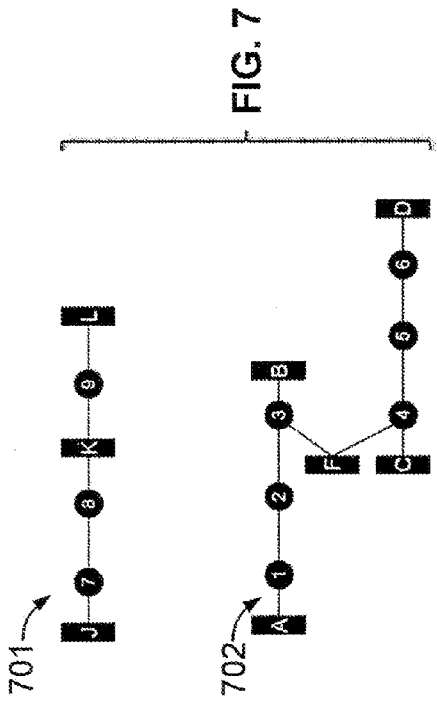
FIG. 7 shows the result of the application of the technique of FIG. 6.

FIG. 7 illustrates examples of related RTRPs that may be encountered in implementing the invention. Critical chain 701 includes registers J, K, and L, and combinational logic nodes 7, 8, and 9. Paths JK and KL are related as they share a common endpoint at register K. Critical chain 702 includes registers A, B, C and D, and combinational logic nodes 1, 2, 3, 4, 5 and 6. Paths AB and CD are related because moving register C forward would require moving register F forward, which would require moving register B forward.

Returning to FIG. 6, at 603, a directed graph is generated from the related RTRPs. With reference to examples 701, 702 shown in FIG. 7, the related RTRPs may be expressed as follows:

JK:K-forward→KL:K-forward (retiming JK forward requires KL to retime forward)

KL:K-forward→JK:K-forward (retiming KL forward requires JK to retime forward)

CD:C-forward→AB:B-forward (retiming CD forward requires AB to retime forward)

AB:B-forward→CD:C-forward (retiming AB forward requires CD to retime forward)

Again returning FIG. 6, at 604 constraints among the RTRPs are identified. According to an implementation of the present invention, paths that cannot be retimed without violating timing are represented with a constraint that indicates that retiming one end point needs the other to remove. With reference to path 701 of FIG. 7, if AB would not meet timing if we pushed B forward, the following constraint may be expressed:

AB:B-forward→AB:A-forward

According to an implementation of the present invention, immutable end points also may be represented by constraints. With reference to path 702 of FIG. 7, given the conditions that A cannot be retimed and D cannot be retimed, the following constraints may be expressed:

AB:A-forward→FAIL

CD:D-backward→FAIL

Again returning FIG. 6, at 605, objective functions are identified. Existing RTRPs are ordered from smallest conventional slack to largest conventional slack. For each path, an objective function is generated which attempts to optimize the path by either moving the first register forward or the second register backward. With reference to path 702 of FIG. 7, the objective functions of moving C forward or moving D backward are identified. The objective functions may be expressed as follows:

CD:C-forward OR CD:D-backward

Again returning FIG. 6, at 606, the objective function is traced through the directed graph. By tracing through the directed graph starting with the objective function, a critical chain may be derived. With reference to path 702 of FIG. 7, CD:C-forward implies AB:B-forward, which implies AB:A-forward implies FAIL. CD:D-backward implies FAIL. Therefore, the critical chain is detected to be AB→CD. The chain slack of the chain is equal to the slack of the original RTRP from which the objective function is derived. If an RTRP is involved in multiple chains, the chain slack equals the worst case value across all chain slacks.

Although in the discussion so far, register retiming has been described as being performed separately and prior to detecting critical chains, it should be appreciated that in alternate implementations, detecting critical chains may be performed prior to register retiming or the two procedures may be performed together concurrently.

According to an implementation of the present invention, information on related register paths that may be derived while performing a topological traversal during register retiming, or information regarding constraints or constructs that limit register movement that may be derived during register retiming, may be used for critical chain detection. These constraints or constructs may include user directives or a synchronizer from a clock crossing.

Once critical chains have been identified, finding a short path, as at 405 or 505, may include finding a critical chain that has an architectural or hold constraint and finding any related paths that would violate the hold if retimed.

Figure 8:
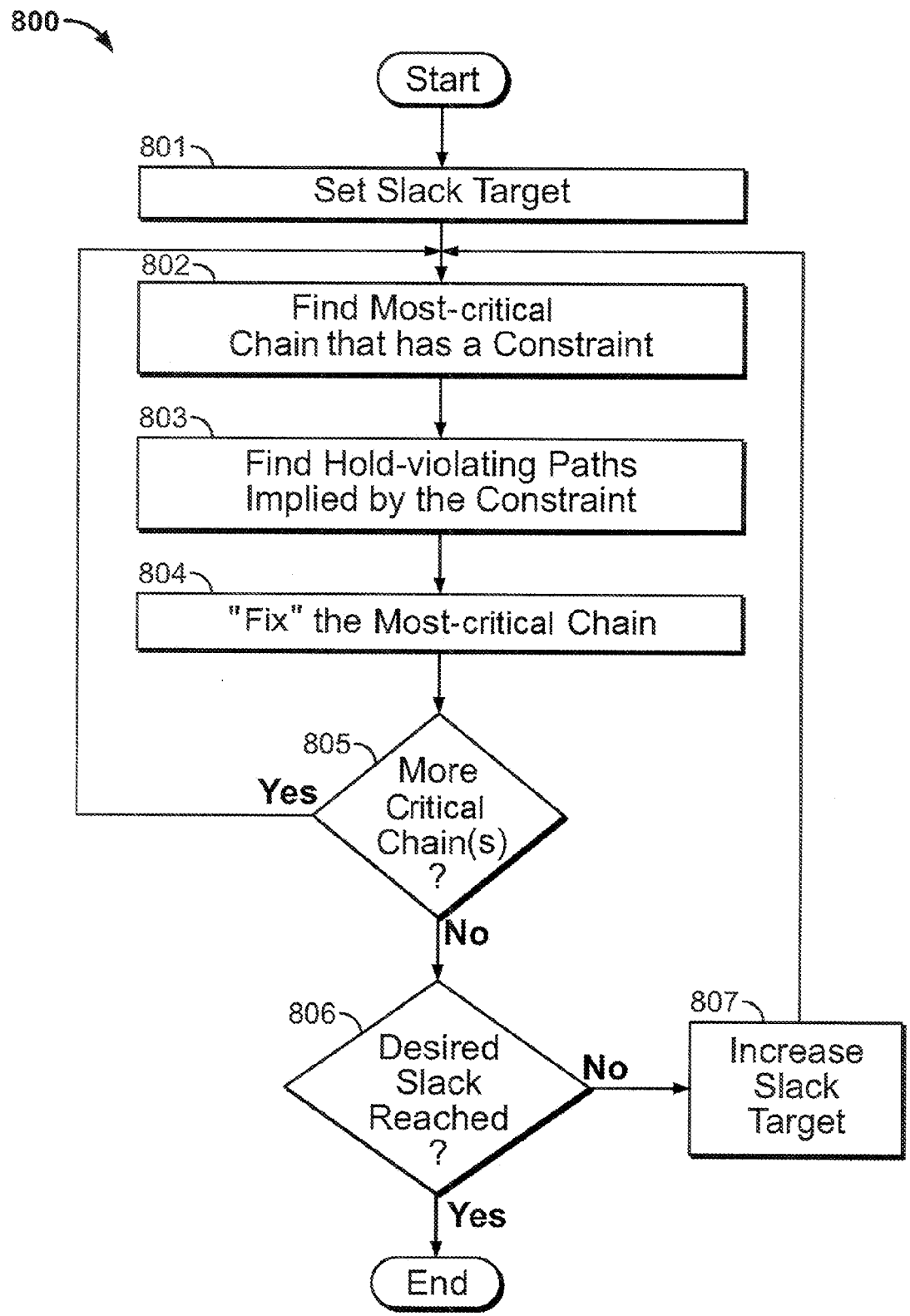
FIG. 8 shows an alternate implementation of a portion of the embodiment diagrammed in FIG. 4.

In another implementation 800 of short path analysis 405 or 505, as shown in FIG. 8, a more complete analysis of each critical chain is performed that takes into account all downstream paths through each retiming register location.

At 801, a slack target is selected based, e.g., on the desired operating frequency of the circuit. Next, at 802, the most critical chain (of the chains identified as critical as discussed above) that has an architectural or hold constraint, is found. At 803, any path or paths that violate that constraint are found. Then, at 804, it is assumed that the violation is fixed. One way to do so is to relax the constraint (see discussion above in connection with FIGS. 6 and 7) until the critical chain ceases to be critical.

Once the violation has been "fixed," at 805, it is determined whether there are any additional critical chains further downstream that would be reached if the previous critical chain were to have been "fixed." For any such critical chains, implementation 800 returns to 802, 803 and 804 to "fix" those critical chains.

Once no further critical chains can be found at 805, then at 806 it is determined whether the desired slack has been achieved. If so, implementation 800 ends. But if at 806 the desired slack has not been achieved, then at 807 the slack target is increased and implementation 800 returns to 802 to find and "fix" more critical chains.

If there were no slack target, it might be possible to find a large number of potential improvements, but at some point, there would be diminishing returns. The imposition of a slack target is a way of stopping the process before the point at which returns have diminished too far. In practice, this might reflect a point at which the number of potential retiming registers through which a path can be rerouted cannot be increased. At such a point, further attempts to improve performance may stop.

Thus it is seen that a programmable device in which a logic design or configuration is implemented by routing and retiming the logic design without exceeding the ability of the circuit to be retimed to accept the retiming, has been provided.

Instructions for carrying out a method according to this invention for programming a programmable device may be encoded on a machine-readable medium, to be executed by a suitable computer or similar device to implement the method of the invention for programming or configuring PLDs or other programmable devices. For example, a personal computer may be equipped with an interface to which a PLD can be connected, and the personal computer can be used by a user to program the PLD using suitable software tools as described above FIG. 9 presents a cross section of a magnetic data storage medium 1200 which can be encoded with a machine executable program that can be carried out by systems such as the aforementioned personal computer, or other computer or similar device. Medium 1200 can be a floppy diskette or hard disk, or magnetic tape, having a suitable substrate 1201, which may be conventional, and a suitable coating 1202, which may be conventional, on one or both sides, containing magnetic domains (not visible) whose polarity or orientation can be altered magnetically. Except in the case where it is magnetic tape, medium 1200 may also have an opening (not shown) for receiving the spindle of a disk drive or other data storage device.

The magnetic domains of coating 1202 of medium 1200 are polarized or oriented so as to encode, in manner which may be conventional, a machine-executable program, for execution by a programming system such as a personal computer or other computer or similar system, having a socket or peripheral attachment into which the PLD to be programmed may be inserted, to configure appropriate portions of the PLD, including its specialized processing blocks, if any, in accordance with the invention.

FIG. 10 shows a cross section of an optically-readable data storage medium 1210 which also can be encoded with such a machine-executable program, which can be carried out by systems such as the aforementioned personal computer, or other computer or similar device. Medium 1210 can be a conventional compact disk read-only memory (CD-ROM) or digital video disk read-only memory (DVD-ROM) or a rewriteable medium such as a CD-R, CD-RW, DVD-R, DVD-RW, DVD+R, DVD+RW, or DVD-RAM or a magneto-optical disk which is optically readable and magneto-optically rewriteable. Medium 1210 preferably has a suitable substrate 1211, which may be conventional, and a suitable coating 1212, which may be conventional, usually on one or both sides of substrate 1211.

In the case of a CD-based or DVD-based medium, as is well known, coating 1212 is reflective and is impressed with a plurality of pits 1213, arranged on one or more layers, to encode the machine-executable program. The arrangement of pits is read by reflecting laser light off the surface of coating 1212. A protective coating 1214, which preferably is substantially transparent, is provided on top of coating 1212.

In the case of magneto-optical disk, as is well known, coating 1212 has no pits 1213, but has a plurality of magnetic domains whose polarity or orientation can be changed magnetically when heated above a certain temperature, as by a laser (not shown). The orientation of the domains can be read by measuring the polarization of laser light reflected from coating 1212. The arrangement of the domains encodes the program as described above.

Figure 11:
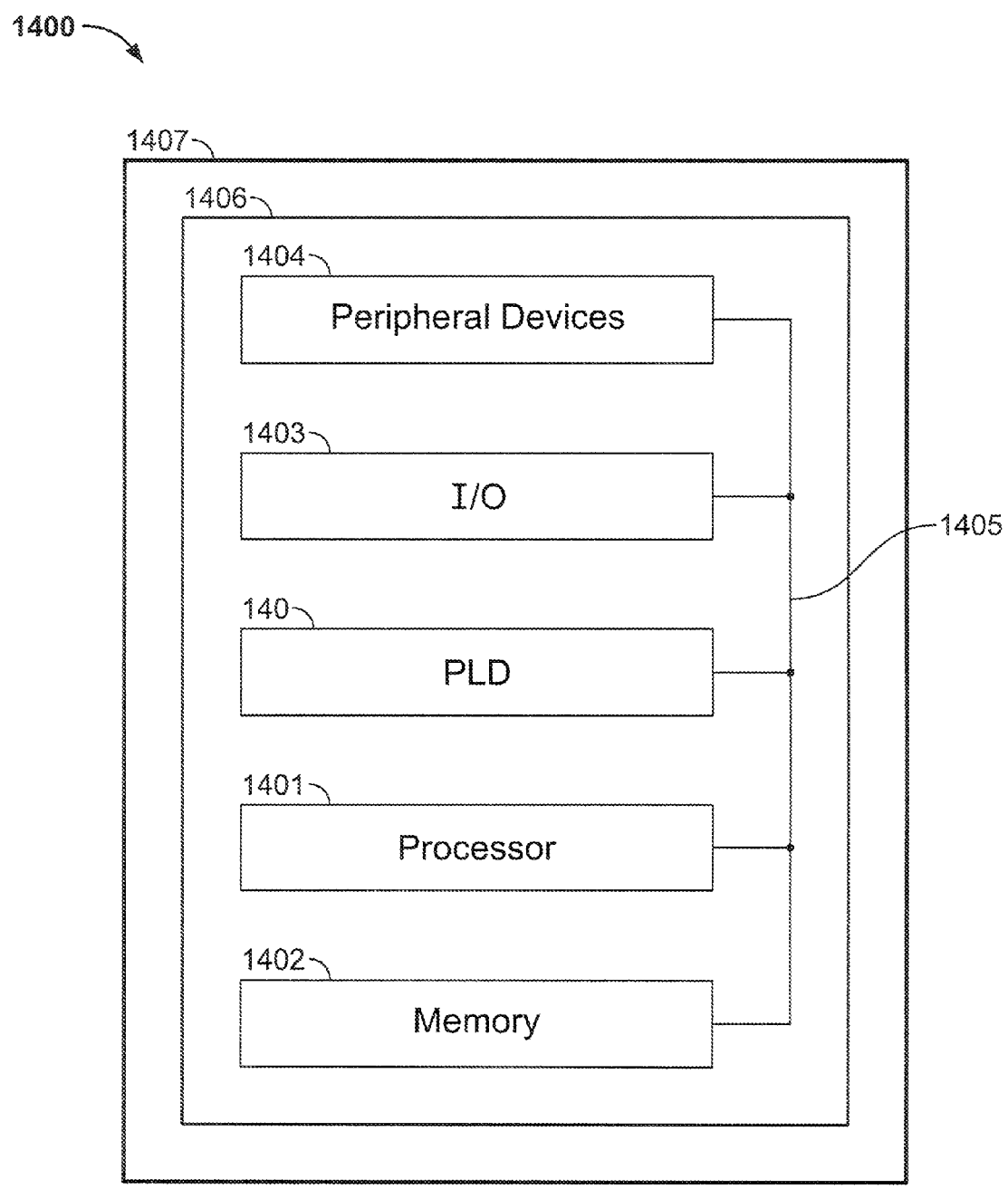
FIG. 11 is a simplified block diagram of an illustrative system employing a programmable logic device incorporating the present invention.

A PLD 140 programmed according to the present invention may be used in many kinds of electronic devices. One possible use is in a data processing system 1400 shown in FIG. 11. Data processing system 1400 may include one or more of the following components: a processor 1401; memory 1402; I/O circuitry 1403; and peripheral devices 1404. These components are coupled together by a system bus 1405 and are populated on a circuit board 1406 which is contained in an end-user system 1407.

System 1400 can be used in a wide variety of applications, such as computer networking, data networking, instrumentation, video processing, digital signal processing, or any other application where the advantage of using programmable or reprogrammable logic is desirable. PLD 140 can be used to perform a variety of different logic functions. For example, PLD 140 can be configured as a processor or controller that works in cooperation with processor 1401. PLD 140 may also be used as an arbiter for arbitrating access to a shared resources in system 1400. In yet another example, PLD 140 can be configured as an interface between processor 1401 and one of the other components in system 1400.

It should be noted that system 1400 is only exemplary, and that the true scope and spirit of the invention should be indicated by the following claims.

Various technologies can be used to implement PLDs 140 as described above and incorporating this invention.

It will be understood that the foregoing is only illustrative of the principles of the invention, and that various modifications can be made by those skilled in the art without departing from the scope and spirit of the invention. For example, the various elements of this invention can be provided on a PLD in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. A method of configuring an integrated circuit device, that has a limited number of registers available for retiming, with a user logic design, said method comprising:
    placing and routing said user logic design on said integrated circuit device that has said limited number of registers available for retiming;
    retiming said placed and routed user logic design on said integrated circuit device that has said limited number of registers available for retiming;
    examining said retimed, placed and routed user logic design, on said integrated circuit device that has said limited number of registers available for retiming, for at least one path that lacks sufficient registers for retiming;
    rerouting said examined, retimed, placed and routed user logic design on said integrated circuit device that has said limited number of registers available for retiming, to find additional registers on said integrated circuit device that are available for retiming; and
    further retiming said at least one path, on said integrated circuit device that has said limited number of registers available for retiming, using said additional registers.

2. The method of claim 1 wherein said integrated circuit device is a programmable integrated circuit device, said method further comprising:
    generating a configuration bitstream based on said placing and routing, said retiming, said examining, said rerouting and said further retiming; and
    storing said configuration bitstream in memory of said programmable integrated circuit device.

3. The method of claim 1 wherein said examining, said rerouting and said further retiming are performed iteratively until a condition is met.

4. The method of claim 3 wherein:
said condition is a failure condition; and
upon detection of said failure condition, said method is terminated.

5. The method of claim 3 wherein said condition is a minimum acceptable performance criterion.

6. The method of claim 5 wherein said minimum acceptable performance criterion comprises a device clock speed.

7. The method of claim 1 wherein said examining comprises examining only each of said at least one path.

8. The method of claim 1 wherein said examining comprises, for each of said at least one path:
assuming that said at least one path is rerouted and again retimed; and
examining further paths downstream from said at least one path.

9. The method of claim 8 wherein said assuming and said examining further are performed iteratively until a condition is met.

10. The method of claim 9 wherein said condition is a performance criterion.

11. A non-transitory machine readable storage medium encoded with instructions for performing a method of configuring an integrated circuit device, that has a limited number of registers available for retiming, with a user logic design, said instructions comprising:
instructions for placing and routing said user logic design on said integrated circuit device that has said limited number of registers available for retiming;
instructions for retiming said placed and routed user logic design on said integrated circuit device that has said limited number of registers available for retiming;
instructions for examining said retimed, placed and routed user logic design, on said integrated circuit device that has said limited number of registers available for retiming, for at least one path that lacks sufficient registers for retiming;
instructions for rerouting said examined, retimed, placed and routed user logic design on said integrated circuit device that has said limited number of registers available for retiming, to find additional registers on said integrated circuit device that are available for retiming; and
instructions for further retiming said at least one path, on said integrated circuit device that has said limited number of registers available for retiming, using said additional registers.

12. The non-transitory machine readable storage medium of claim 11 wherein said integrated circuit device is a programmable integrated circuit device, said instructions further comprising:
instructions for generating a configuration bitstream based on said placing and routing, said retiming, said examining, said rerouting and said further retiming; and
instructions for storing said configuration bitstream in memory of said programmable integrated circuit device.

13. The non-transitory machine readable storage medium of claim 11 wherein said instructions further comprise instructions to execute said instructions for examining, said instructions for rerouting and said instructions for further retiming iteratively until a condition is met.

14. The non-transitory machine readable storage medium of claim 13 wherein:
said condition is a failure condition; and
said instructions comprise instructions to terminate said method upon detection of said failure condition.

15. The non-transitory machine readable storage medium of claim 13 wherein said condition is a minimum acceptable performance criterion.

16. The non-transitory machine readable storage medium of claim 15 wherein said minimum acceptable performance criterion comprises a device clock speed.

17. The non-transitory machine readable storage medium of claim 11 wherein said instructions for examining comprise instructions to examine only each of said at least one path.

18. The non-transitory machine readable storage medium of claim 11 wherein said instructions for examining comprise instructions to, for each of said at least one path:
assume that said at least one path is rerouted and again retimed; and
examine further paths downstream from said at least one path.

19. The non-transitory machine readable storage medium of claim 18 wherein instructions further comprise instructions to iteratively execute said instructions to assume, and said instructions to examine further, until a condition is met.

20. The non-transitory machine readable storage medium of claim 19 wherein said condition is a performance criterion.

* * * * *